US012578907B2

(12) United States Patent
Ishikawa et al.

(10) Patent No.: US 12,578,907 B2
(45) Date of Patent: Mar. 17, 2026

(54) PRINTED MATERIAL INSPECTION SYSTEM, PRINTED MATERIAL INSPECTION METHOD, AND NON-TRANSITORY COMPUTER READABLE MEDIUM

(71) Applicant: FUJIFILM Business Innovation Corp., Tokyo (JP)

(72) Inventors: Shogo Ishikawa, Yokohama (JP); Yoshie Ohira, Yokohama (JP); Takashi Kikumoto, Yokohama (JP)

(73) Assignee: FUJIFILM BUSINESS INNOVATION CORP., Tokyo (JP)

( * ) Notice: Subject to any disclaimer, the term of this patent is extended or adjusted under 35 U.S.C. 154(b) by 470 days.

(21) Appl. No.: 17/885,834

(22) Filed: Aug. 11, 2022

(65) Prior Publication Data

US 2023/0297297 A1 Sep. 21, 2023

(30) Foreign Application Priority Data

Mar. 17, 2022 (JP) ................................. 2022-042871

(51) Int. Cl.
*G06F 3/12* (2006.01)
*G06T 7/00* (2017.01)

(52) U.S. Cl.
CPC ............ *G06F 3/121* (2013.01); *G06F 3/1207* (2013.01); *G06F 3/1208* (2013.01);
(Continued)

(58) Field of Classification Search
None
See application file for complete search history.

(56) References Cited

U.S. PATENT DOCUMENTS

2014/0079292 A1 3/2014 Kaneko et al.
2019/0105895 A1 4/2019 Muehl et al.
(Continued)

FOREIGN PATENT DOCUMENTS

JP 2020-082421 A 6/2020
JP 2020-205567 A 12/2020

OTHER PUBLICATIONS

May 25, 2023 Extended Search Report issued in European Patent Application No. 22193054.8.
(Continued)

*Primary Examiner* — Darryl V Dottin
(74) *Attorney, Agent, or Firm* — Oliff PLC

(57) ABSTRACT

A printed material inspection system includes a processor configured to inspect a quality of a printed material; and a display that displays a result of the inspection. The processor is configured to: by reading and executing a program, compare a scanned image obtained by scanning an inspection target page of the printed material, out of pages forming a job, with a reference image created based on rasterize data of the inspection target page and perform an inspection of whether or not a first defect is present in the scanned image at a first inspection level, which is a preset initial level or a level set by a user; automatically perform an inspection of whether or not a second defect is present in the scanned image at a second inspection level that is different from the first inspection level; and display the first defect and the second defect on the display in such a manner that the first defect and the second defect are able to be distinguished from each other.

21 Claims, 10 Drawing Sheets

(52) U.S. Cl.
CPC ............ *G06F 3/1256* (2013.01); *G06T 7/001* (2013.01); *G06T 2207/30144* (2013.01)

(56) References Cited

U.S. PATENT DOCUMENTS

| | | | | |
|---|---|---|---|---|
| 2020/0135073 | A1* | 4/2020 | Kim .................... | G01R 19/0053 |
| 2021/0385339 | A1* | 12/2021 | Iida ...................... | H04N 1/0044 |
| 2023/0068167 | A1* | 3/2023 | Lubin .................... | B41J 2/2135 |

OTHER PUBLICATIONS

Jan. 6, 2026 Office Action issued in Japanese Patent Application No. 2022-042871.

* cited by examiner

| SIZE / COLOR DIFFERENCE | 0.3 mm | 0.5 mm | 0.7 mm | 1.0 mm | 1.5 mm |
|---|---|---|---|---|---|
| 40% | | | | | |
| 50% | | | | | |
| 60% | | | | | |
| 70% | | | | | |
| 80% | | | | | |

30      32      34

| Low | Standard | High |
|---|---|---|

44 — 42 — 40

LOOSE                    INSPECTION LEVEL                    STRICT

PRINTED MATERIAL INSPECTION SYSTEM, PRINTED MATERIAL INSPECTION METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2022-042871 filed Mar. 17, 2022.

BACKGROUND

(i) Technical Field

The present disclosure relates to a printed material inspection system, a printed material inspection method, and a non-transitory computer readable medium.

(ii) Related Art

An image inspection report creation apparatus that displays only a defect that is recognized as being necessary for a user to understand in a result report, is described in Japanese Unexamined Patent Application Publication No. 2020-082421. The image inspection report creation apparatus includes an inspection image generation unit that generates an inspection image so that a read image read by an image reading unit is inspected, a difference level calculation unit that calculates a difference level indicating the degree of a difference between the inspection image and the read image on the basis of the difference, a display determination unit that compares the difference level calculated by the difference level calculation unit with a reference difference level that is set in advance to determine whether or not to display the difference in a result report, and a file creation unit that creates the result report regarding the difference on the basis of a result of the determination by the display determination unit.

An image processing apparatus capable of appropriately reusing a non-defective material and excluding a defective material even when an image abnormality detection condition for a discharged printed material is changed and re-determination is performed, is described in Japanese Unexamined Patent Application Publication No. 2020-205567. The image processing apparatus includes a printing unit that outputs a printed material, a reading unit that reads the printed material and obtains a read image, a determination unit that analyzes the read image to detect an image abnormality and determines the quality of the printed material, a paper discharge unit that discharges the printed material on the basis of the determination result while sorting printed materials into a non-defective material and a defective material, and a notification unit that displays a result of the detection of an image abnormality on a display unit and accepts a change in a detection threshold and/or a detection item for an image abnormality. When the detection threshold and/or the detection item for an image abnormality is changed, the determination unit re-determines the discharged printed material, and the notification unit provides a notification on the output position of the printed material for which the determination regarding the quality has been changed.

SUMMARY

In an inspection system that inspects the quality of a printed material, the level of the inspection is based on a default value of the system or set by a user. However, it becomes possible to determine whether setting of the inspection level is appropriate only after the printed material is printed and the inspection of the printed material is completed. Even if the setting level was too strict or too loose, it is not easy to change the setting level. In particular, an appropriate inspection level may differ depending on a print job. Thus, the inspection level needs to be flexibly changed for each job.

Aspects of non-limiting embodiments of the present disclosure relate to providing a technique capable of easily determining whether or not the level of an initial inspection is appropriate and easily changing an inspection level if the level of the initial inspection is not appropriate.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a printed material inspection system including a processor configured to inspect a quality of a printed material and a display that displays a result of the inspection. The processor is configured to: by reading and executing a program, compare a scanned image obtained by scanning an inspection target page of the printed material, out of pages forming a job, with a reference image created based on rasterize data of the inspection target page and perform an inspection of whether or not a first defect is present in the scanned image at a first inspection level, which is a preset initial level or a level set by a user; automatically perform an inspection of whether or not a second defect is present in the scanned image at a second inspection level that is different from the first inspection level; and display the first defect and the second defect on the display in such a manner that the first defect and the second defect are able to be distinguished from each other.

BRIEF DESCRIPTION OF THE DRAWINGS

Exemplary embodiments of the present disclosure will be described in detail based on the following figures, wherein:

FIG. 14 illustrates a second example of a screen for an inspection result in a modification.

DETAILED DESCRIPTION

Hereinafter, exemplary embodiments of the present disclosure will be described with reference to drawings.

Figure 1:
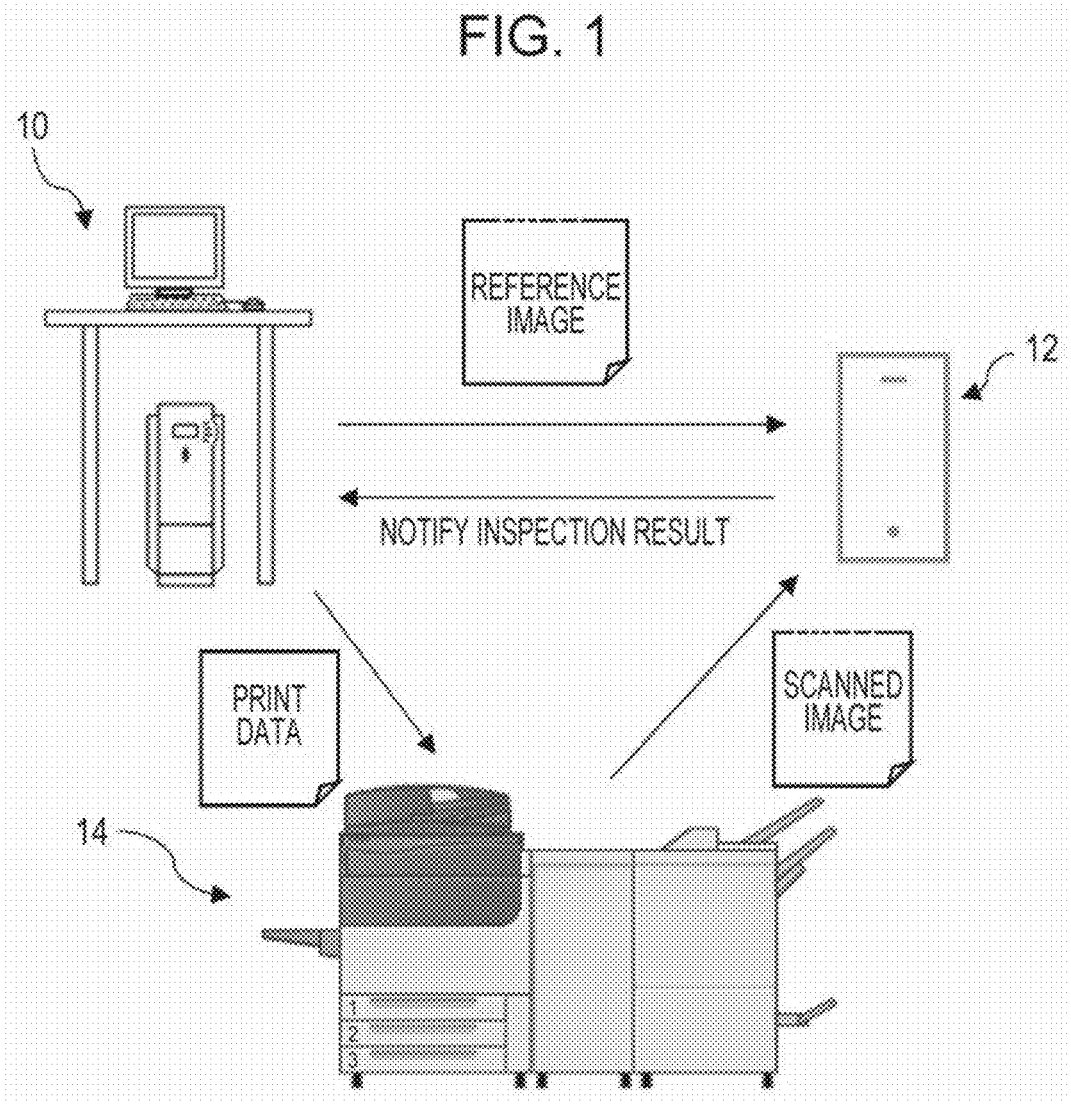
FIG. 1 is a system configuration diagram of a printed material inspection system according to an exemplary embodiment.

FIG. 1 is a system configuration diagram of a printed material inspection system according to an exemplary embodiment. The printed material inspection system includes a print server 10, a printed material inspection apparatus 12, and a printer 14. The print server 10, the printed material inspection apparatus 12, and the printer 14 are connected to one another through a communication line such that data transmission and reception is performed. The communication line may be wired or wireless and may be a public line or a private line. The communication line is, for example, a local area network (LAN). However, the communication line is not limited to a LAN.

The print server 10 supplies print data of a print job to the printer 14. Furthermore, the print server 10 generates, in addition to the print data, reference image data based on a rasterization result of the print job, and supplies the reference image data to the printed material inspection apparatus 12. Rasterization is well-known processing for generating raster data (image data) by performing rendering based on data of an intermediate format.

The printer 14 receives the print data from the print server 10 and performs printing based on the print data on paper. A printed material is discharged from a discharge tray of the printer 14. The printer 14 includes a built-in scanner. The printer 14 scans a printed material with the built-in scanner to generate scanned image data, and supplies the scanned image data to the printed material inspection apparatus 12.

The configuration of the printer 14 is well known. However, the configuration of the printer 14 will be described briefly below. The printer 14 prints an image on a printing medium such as paper on the basis of a job (print job) acquired from the print server 10. A print job represents a processing unit of a printing operation instructed by a single printing instruction.

The printer 14 includes a storage unit, a transport unit, a printing unit, a discharge unit, and a controller. The storage unit has a function for accommodating paper to be supplied to the printing unit and includes a storage tray in which paper is loaded.

The transport unit has a function for transporting paper accommodated in the storage unit to the printing unit. The transport unit includes, for example, a sending roll for sending paper from the storage unit and a pair of transport rolls arranged along a transport path extending from the storage unit to the printing unit.

The printing unit has a function for printing an image on paper. For example, the printing unit prints an image on paper by an electrophotographic method. That is, the printing unit prints an image on paper going through processes including charging, exposure, development, transfer, and fixing. Furthermore, the printing unit may have a function for transporting reversed paper so that images are printed on both sides of the paper.

The discharge unit is a part to which printed paper is discharged. The discharge unit includes, for example, multiple sections that are arranged vertically. Paper is discharged to a section specified in a print job.

The controller controls operations of the individual units of the printer 14. In this exemplary embodiment, the controller controls an operation of the built-in scanner to scan a printed material printed by the printing unit and generate scanned image data for a page set as an inspection target, out of all the pages forming a job, by turning on the operation of the built-in scanner. In contrast, the controller turns off the operation of the built-in scanner and does not generate scanned image data for a page set as a non-inspection target, out of all the pages forming the job. The controller acquires information regarding whether or not a page is an inspection target from a user terminal operated by the user or the print server 10. The controller may acquire the information from the printed material inspection apparatus 12.

The printed material inspection apparatus 12 acquires the reference image data from the print server 10 and the scanned image data from the printer 14. The printed material inspection apparatus 12 detects an abnormality in printing by comparing the reference image data with the scanned image data for a page set as an inspection target out of all the pages forming the print job. The printed material inspection apparatus 12 displays an inspection result on a display so that the inspection result is notified to the user.

Figure 2:
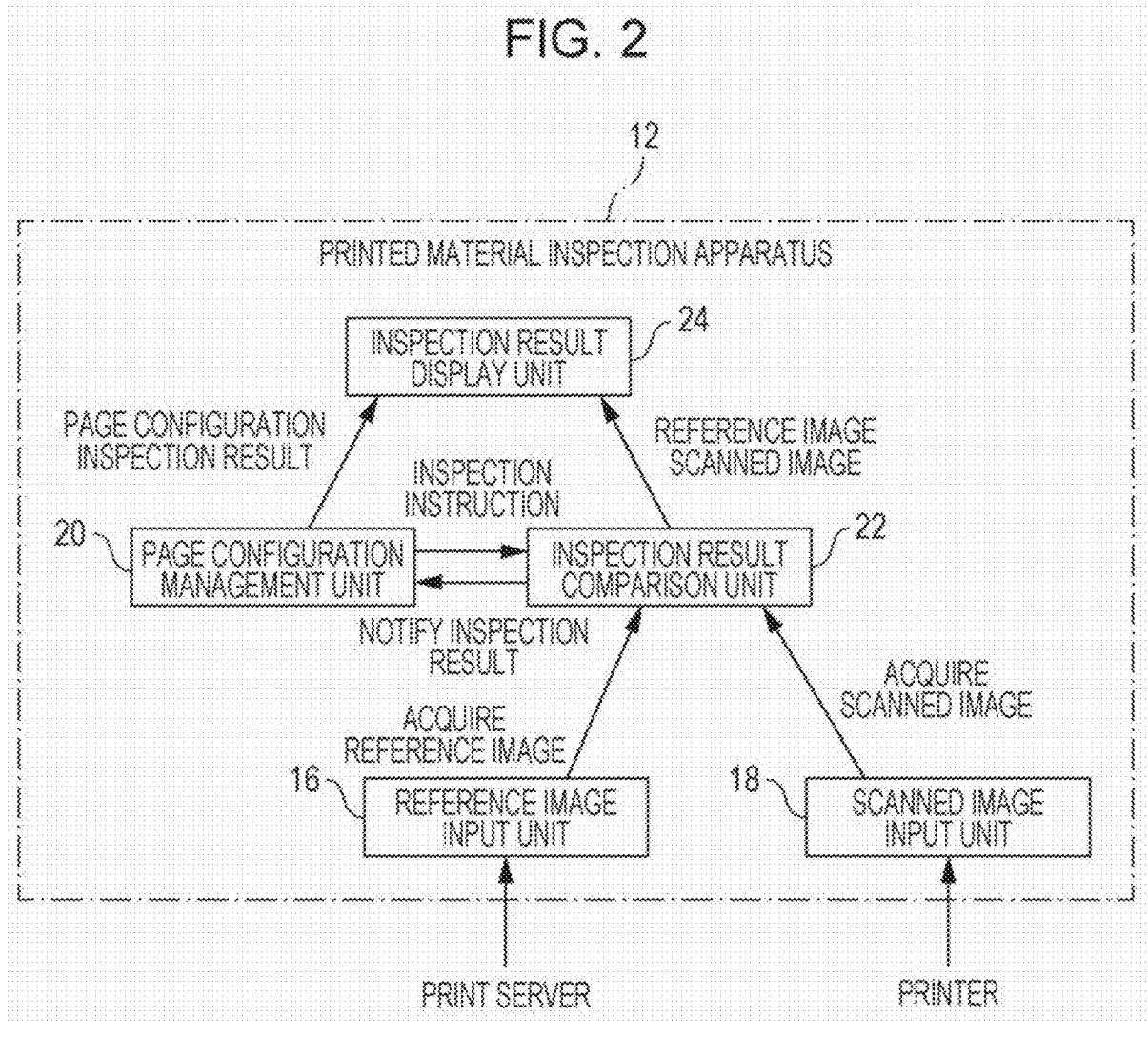
FIG. 2 is a functional block diagram of a printed material inspection apparatus according to an exemplary embodiment.

FIG. 2 is a functional block diagram of the printed material inspection apparatus 12. The printed material inspection apparatus 12 includes, as functional blocks, a reference image input unit 16, a scanned image input unit 18, a page configuration management unit 20, an inspection result comparison unit 22, and an inspection result display unit 24.

The reference image input unit 16 inputs reference image data created by the print server 10. The reference image input unit 16 may generate reference image data based on job data acquired from the print server 10, that is, based on a rasterization result of a job. The reference image data may be generated by the print server 10 or the printed material inspection apparatus 12.

The scanned image input unit 18 inputs scanned image data obtained by scanning with the built-in scanner of the printer 14.

The page configuration management unit 20 manages information about pages forming the job, a determination regarding whether or not each of the pages is an inspection target, and an inspection result for each of the pages determined to be an inspection target.

The inspection result comparison unit 22 compares a reference image with a scanned image for each page and determines whether or not there is an abnormality in a result of printing by the printer 14. Abnormalities in printing results include specks in printing and failure in printing. The inspection result comparison unit 22 notifies the page configuration management unit 20 of an inspection result and supplies reference image data and scanned image data to the inspection result display unit 24.

The inspection result display unit 24 receives data from the page configuration management unit 20, that is, page configuration data and inspection result data, and displays and outputs an inspection result based on the received data.

Specifically, the inspection result display unit 24 displays a scanned image or both a reference image and a scanned image of each page on the basis of page configuration data of a job. In the case where the inspection result indicates that there is an abnormality in printing, the inspection result display unit 24 highlights a region in a scanned image where the abnormality is detected, so that the user is able to easily recognize the region where the abnormality is detected. Highlighting a region where the abnormality is detected may be, for example, indicating the region using an arrow, displaying the region in a specific color, or surrounding the region in a specific shape or a specific type of line. However, the way of highlighting is not particularly limited.

Figure 3:
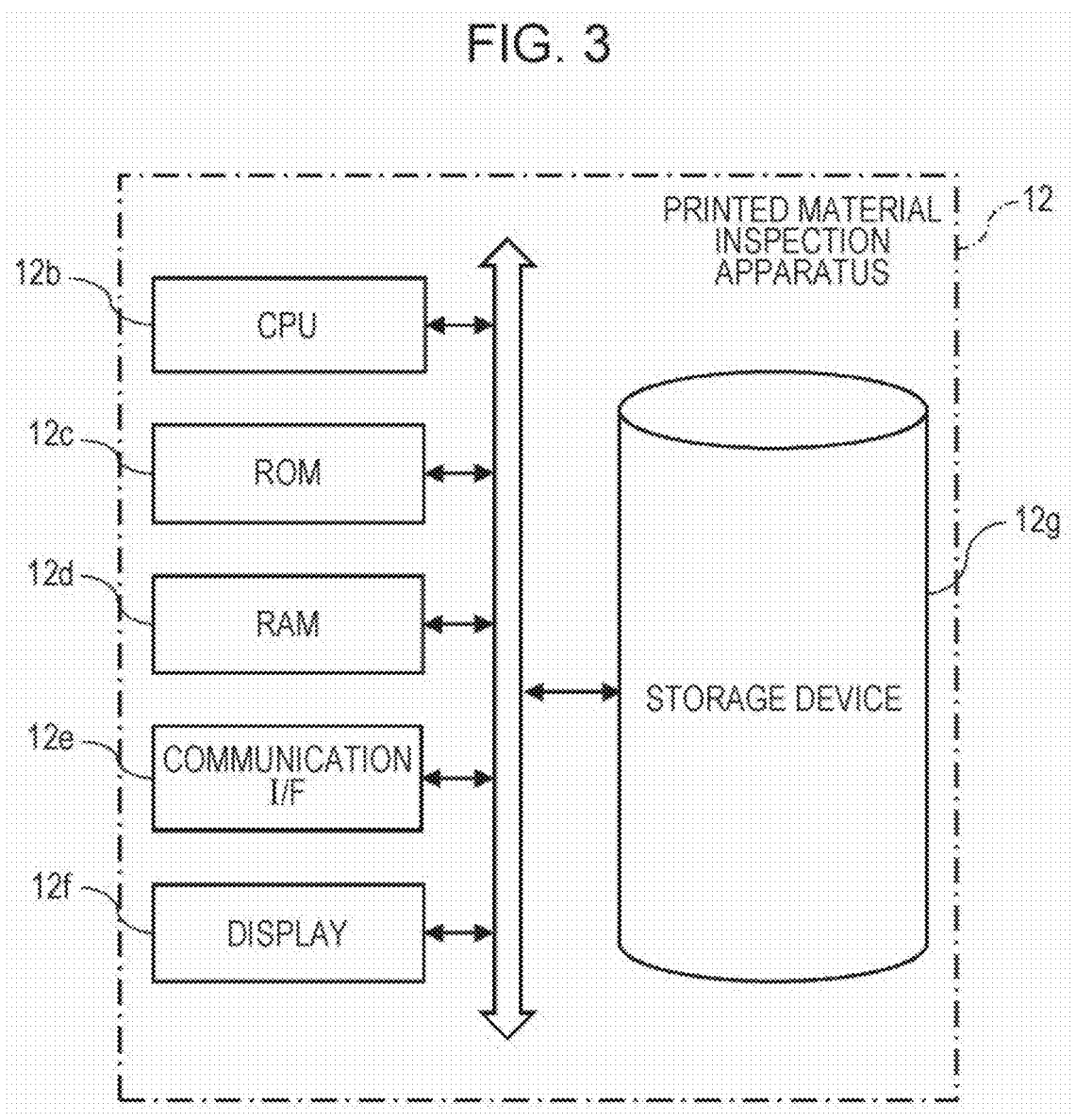
FIG. 3 is a configuration block diagram of a printed material inspection apparatus according to an exemplary embodiment.

FIG. 3 is a configuration block diagram of the printed material inspection apparatus 12. The printed material inspection apparatus 12 includes one or more computers. The printed material inspection apparatus 12 includes one or more central processing unit (CPUs) 12*b*, a read only memory (ROM) 12*c*, a random access memory (RAM) 12*d*, a communication interface (I/F) 12*e*, a display 12*f*, and a storage device 12*g*.

Each of the one or more CPUs 12*b* implements various functions by reading a program stored in the ROM 12*c* or the storage device 12*g* and using the RAM 12*d* as a working memory. The CPU 12*b* implements the page configuration management unit 20 and the inspection result comparison unit 22 illustrated in FIG. 2.

The communication I/F 12*e* receives reference image data supplied from the print server 10 and receives scanned image data supplied from the printer 14. The communication I/F 12*e* outputs the received reference image data and scanned image data to the CPU 12*b*.

The display 12*f* includes a cathode ray tube (CRT) display, a liquid crystal display, an organic electroluminescence (EL) display, or the like. The display 12*f* displays a page configuration inspection result acquired from the CPU 12*b* and displays a reference image and a scanned image. The display 12*f* implements the inspection result display unit 24 illustrated in FIG. 2.

The storage device 12*g* includes a nonvolatile memory such as a hard disk drive (HDD) or a solid state drive (SSD). The storage device 12*g* stores a program and various image data.

The printed material inspection apparatus 12 according to this embodiment performs, as a basic operation, an inspection of whether or not there is an abnormality such as specks in a printed material by comparing a reference image acquired from the print server 10, that is, a reference image serving as a reference for the inspection created based on a rasterization result of a job, with a scanned image obtained by scanning with the built-in scanner the printed material printed by the printer 14, and displays a result of the inspection.

All the pages forming a job output from the printer 14 are not necessarily set as inspection targets. In cases described below, some pages may be set as non-inspection targets.
(1) Case where a Printing Target Page is Set as a Non-Inspection Target by a User This is because false detection may occur when, in a page using pre-print paper, a pre-print image that is not included in a reference image is recorded in a scanned image. Furthermore, this is because false detection may occur when, in a page using paper that is intentionally provided with a pattern of paper, such as embossed paper, the pattern of the paper is recorded in a scanned image. Furthermore, this is because the user may intentionally exclude a page determined to be unimportant due to the configuration of a job from an inspection target.
(2) Case where a Blank Page on which Printing is not Performed Due to the Configuration of a Job is Inserted This is because a blank page used for sorting on which printing is not performed may be inserted for separation between copies of a job. Furthermore, this is because a recovery sheet may be inserted when a paper jam occurs. Furthermore, this is because the rear side of paper is blank when an odd number of pages are printed with double-sided printing.

In contrast, as described above, an inspection of whether or not there is an abnormality such as specks in a printed material is performed for a page set as an inspection target by comparing a reference image acquired from the print server 10, that is, a reference image serving as a reference for the inspection created based on a rasterization result of a job, with a scanned image obtained by scanning with the built-in scanner the printed material printed by the printer 14, and a result of the inspection is displayed. It is desirable that a plurality of thresholds or inspection levels for determining whether there is an abnormality or defect for each job be set in advance so that a user is able to set a desired threshold or inspection level for the job. This is because a required inspection level may differ depending on the job or the type or purpose of a printed material. For example, while a printed material does not require a very high inspection level, another printed material requires a high inspection level.

However, depending on a set threshold or inspection level, a minute difference that is unable to be recognized by human eyes may be determined to be an abnormality or defect. Thus, an inspection result may become complicated or unnecessary re-printing may be required because the printed material is treated as a defective printed material. Therefore, a threshold or an inspection level used in the inspection system needs to be set to an accuracy close to the accuracy of visual inspection with human eyes.

Thus, the CPU 12*b* in this exemplary embodiment performs inspections of a printed material on the basis of a plurality of thresholds or inspection levels stored in advance in the storage device 12*g*, and switches display on the display 12*f* between inspection results for the individual thresholds. More specifically, the CPU 12*b* performs an inspection of whether or not a defect is present in a printed material in accordance with a preset initial level or a first threshold (first inspection level) set by a user, and automatically performs an inspection of whether or not a defect is present in the printed material in accordance with a second threshold (second inspection level) that is different from the first threshold (first inspection level). Then, the CPU 12*b* displays detected defects on the display such that the defects are able to be distinguished from each other.

Hereinafter, specific explanation will be provided below by referring to a threshold or an inspection level as an "inspection level" and an abnormality or a defect as a "defect".

Figures 4, 5:
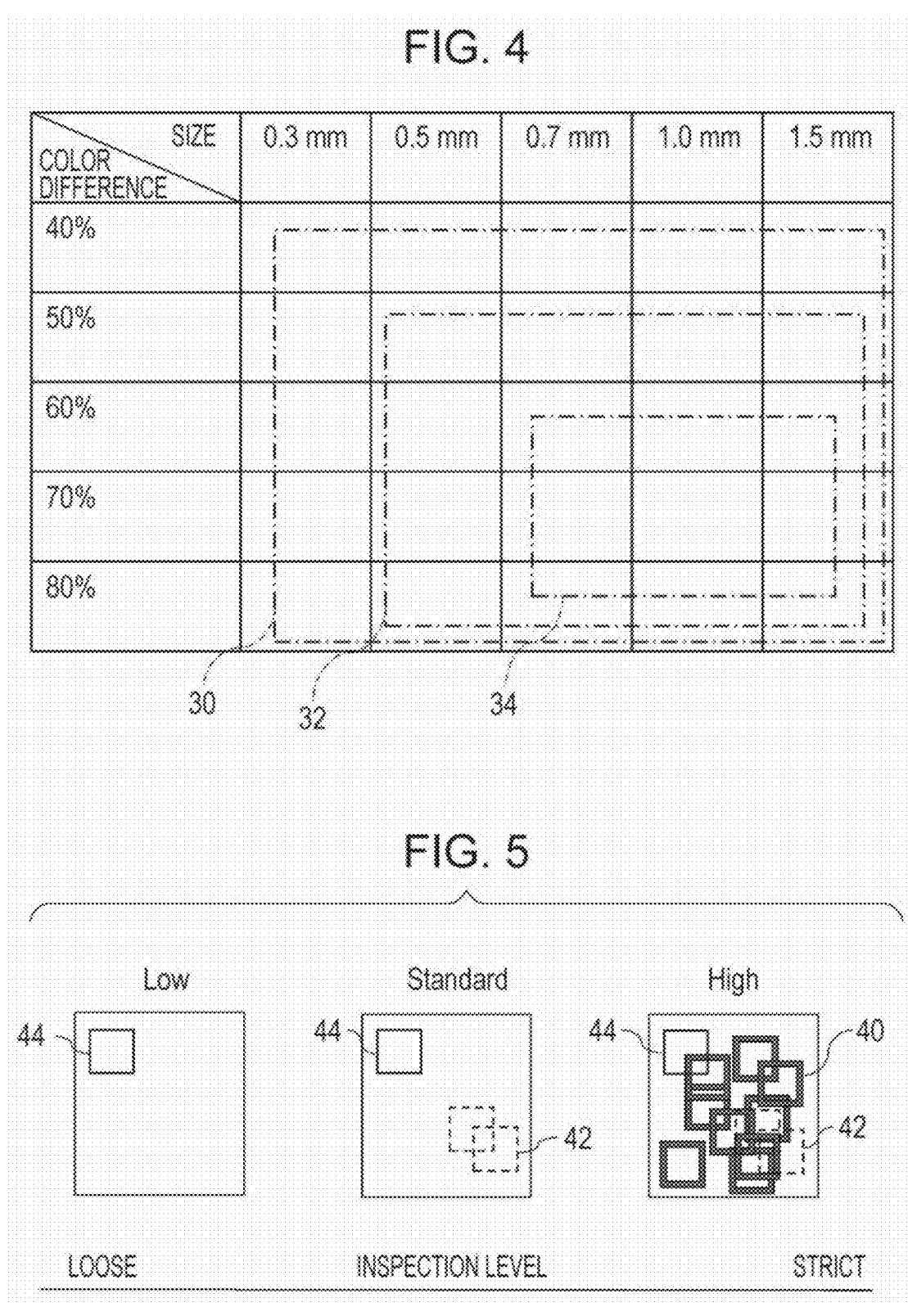
FIG. 4 is a schematic diagram of inspection levels for combinations of color difference and size in an exemplary embodiment.
FIG. 5 is a schematic diagram illustrating a relationship between inspection levels and detected defects in an exemplary embodiment.

FIG. 4 illustrates an example of a plurality of inspection levels used by the CPU 12*b* for inspections of whether or not a defect is present in a printed material. Information about a defect in a job includes x coordinate, y coordinate, color difference, size, and so on. In this example, color difference and size are used as information about a defect. A plurality of inspection levels are set for combinations of color difference and size. The number of inspection levels is set in a desired manner. In this example, three levels: High, Standard, and Low, are set. The inspection levels have the relationship of High>Standard>Low. At the High level, a minute defect with a small color difference and a small size is determined to be a defect. At the Low level, only a defect with a large color difference and a large size is determined to be a defect.

In FIG. 4, a High inspection level 30, a Standard inspection level 32, and a Low inspection level 34 are set for combinations of five levels of color difference ranging from 40% to 80% and five levels of size ranging from 0.3 mm to 1.5 mm. For example, a defect with a color difference of 40% and a size of 0.3 mm is recognized as a defect at the High inspection level 30 but is not recognized as a defect at the Standard inspection level 32 and the Low inspection level 34. Furthermore, a defect with a color difference of 80% and a size of 1.5 mm is recognized as a defect at all the inspection levels 30, 32, and 34.

FIG. 5 schematically illustrates results of inspections at the three inspection levels illustrated in FIG. 4, that is, the High inspection level 30, the Standard inspection level 32, and the Low inspection level 34. In FIG. 5, positions at which defects are detected are indicated as rectangular regions.

As the inspection level increases (becomes stricter) in the order of Low, Standard, and High, the number of defects that are detected increases. In contrast, as the inspection level reduces (becomes looser), the number of defects that are detected decreases. At the High inspection level 30, many defects 40, 42, and 44 are detected. At the Standard inspection level 32, the defects 40, which are detected at the High inspection level 30, are not detected but the defects 42 and 44 are detected. At the Low inspection level 34, the defects 40, which are detected at the High inspection level 30, and the defects 42, which are detected at the Standard inspection level 32, are not detected but only the defect 44 is detected.

In the case where the preset initial level, that is, the default level, is High or in the case where the High level is set by a user, the CPU 12b detects the defects 40, 42, and 44, and displays the detected defects 40, 42, and 44 on the display 12f. However, as illustrated in FIG. 5, because the many defects 40, 42, and 44 are detected and displayed at the High level, display is complicated. Thus, defects that are to be definitely confirmed by visual inspection with human eyes, for example, the defects 42, may be obscured by the defects 40 and overlooked. In particular, as illustrated in FIG. 5, if many defects 40 are present around the defects 42 or are superimposed on the defects 42, the defects 42 are highly likely to be overlooked.

In such a case, by changing the inspection level from High to Standard, the defects 40 are not detected. Thus, the presence of the defects 42, which are to be definitely confirmed by visual inspection with human eyes, becomes clear.

Thus, even in the case where a preset initial level, that is, the default level, is High or even in the case where the High level is set by the user, the CPU 12b automatically performs an inspection at the Standard inspection level concurrently with or subsequently to the inspection at High level, and stores the result of the inspection that has been automatically performed into the storage device 12g or the RAM 12d. Then, the CPU 12b promptly displays the inspection result on the display 12f in accordance with an operation by the user for changing the inspection level. In other words, the CPU 12b automatically performs, in the background, an inspection at an inspection level different from the set inspection level, stores the result of the inspection, and displays, in accordance with a changing operation by the user, the result obtained by the inspection that has been automatically performed.

In the case where the preset initial level, that is, the default level, is High or in the case where the High level is set by the user, the CPU 12b may automatically perform an inspection at the Standard inspection level and an inspection at the Low inspection level concurrently with or subsequently to the inspection at the High level and store the results of the inspections that have been automatically performed into the storage device 12g or the RAM 12d. This is because the case where the user performs an operation for changing the inspection level from High to Standard and further to Low may be expected.

Figures 6, 7:
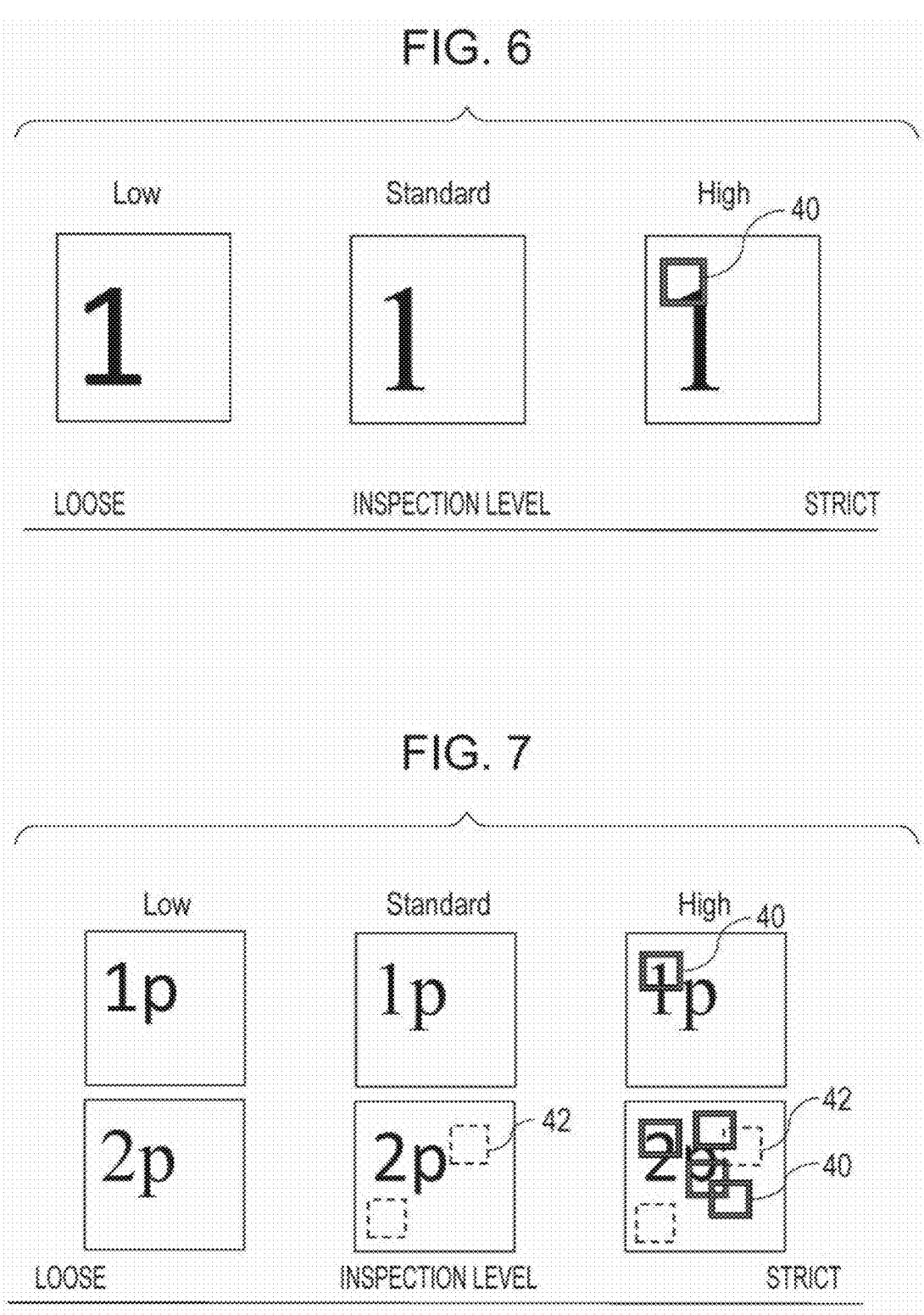
FIG. 6 is another schematic diagram illustrating a relationship between inspection levels and a detected defect in an exemplary embodiment.
FIG. 7 is another schematic diagram illustrating a relationship between inspection levels and detected defects in an exemplary embodiment.

FIG. 6 schematically illustrates other results of inspections at the three inspection levels illustrated in FIG. 4, that is, the High inspection level 30, the Standard inspection level 32, and the Low inspection level 34. In FIG. 6, a position where a defect is detected is indicated as a rectangular region.

In the case where the preset initial level, that is, the default level, is Standard or Low or in the case where the Standard level or the Low level is set by the user, the CPU 12b detects no defect in a printed material and no display is made on the display 12f. However, a defect may be potentially present and a defect that needs to be confirmed by visual inspection with human eyes may be present.

Thus, even in the case where the preset initial level, that is, the default level, is Standard or Low or even in the case where the Standard level or the Low level is set by the user, the CPU 12b automatically performs an inspection at the High inspection level concurrently with or subsequently to the inspection at the Standard level or the Low level, and stores the result of the inspection that has been automatically performed into the storage device 12g or the RAM 12d. Then, the CPU 12b promptly displays the inspection result on the display 12f in accordance with an operation by the user for changing the inspection level. When the inspection level is changed to High, the defect 40, which is not detected by the inspection at the Standard level or the Low level, is detected, and the detected defect 40 is displayed on the display 12f. Finally, the user is able to confirm normality or abnormality by confirming the defect 40 by visual inspection with eyes.

FIG. 7 schematically illustrates other results of inspections at the three inspection levels illustrated in FIG. 4, that is, the High inspection level 30, the Standard inspection level 32, and the Low inspection level 34. In FIG. 7, positions where defects are detected are indicated by rectangular regions. A job includes multiple pages, and inspection results for the first page and the second page among the multiple pages are illustrated in FIG. 7.

At the High inspection level, the defect 40 is detected in the first page, the defects 40 and 42 are detected in the second page, and the detected defects are displayed on the display 12f. At the Standard inspection level, no defect is detected in the first page, the defects 42 are detected in the second page, and the detected defects are displayed on the display 12f. At the Low inspection level, no defect is detected in the first and second pages, and no defect is displayed on the display 12f.

Provided that the defects 42 are defects that are to be detected, the defects 42 are unable to be detected at the Low level but are able to be detected at the Standard level and the High level. The lowest inspection level at which all the defects 42 to be detected are able to be detected is the Standard level.

Thus, regardless of which level is set as the preset initial level, that is, the default level, or set by the user, the CPU 12*b* automatically performs inspections at the three inspection levels, that is, the High level, the Standard level, and the Low level, concurrently with or subsequently to the inspection at the preset initial level or the level set by the user, and stores the results of the inspections that have been automatically performed into the storage device 12*g* or the RAM 12*d*. Then, the CPU 12*b* displays the lowest inspection level at which a defect that is to be detected is able to be detected as the optimal inspection level on the display 12*f*. In this case, the CPU 12*b* displays the inspection result for the Standard level on the display 12*f* in accordance with an operation by the user for changing the inspection level to the optimal inspection level.

Figure 8:
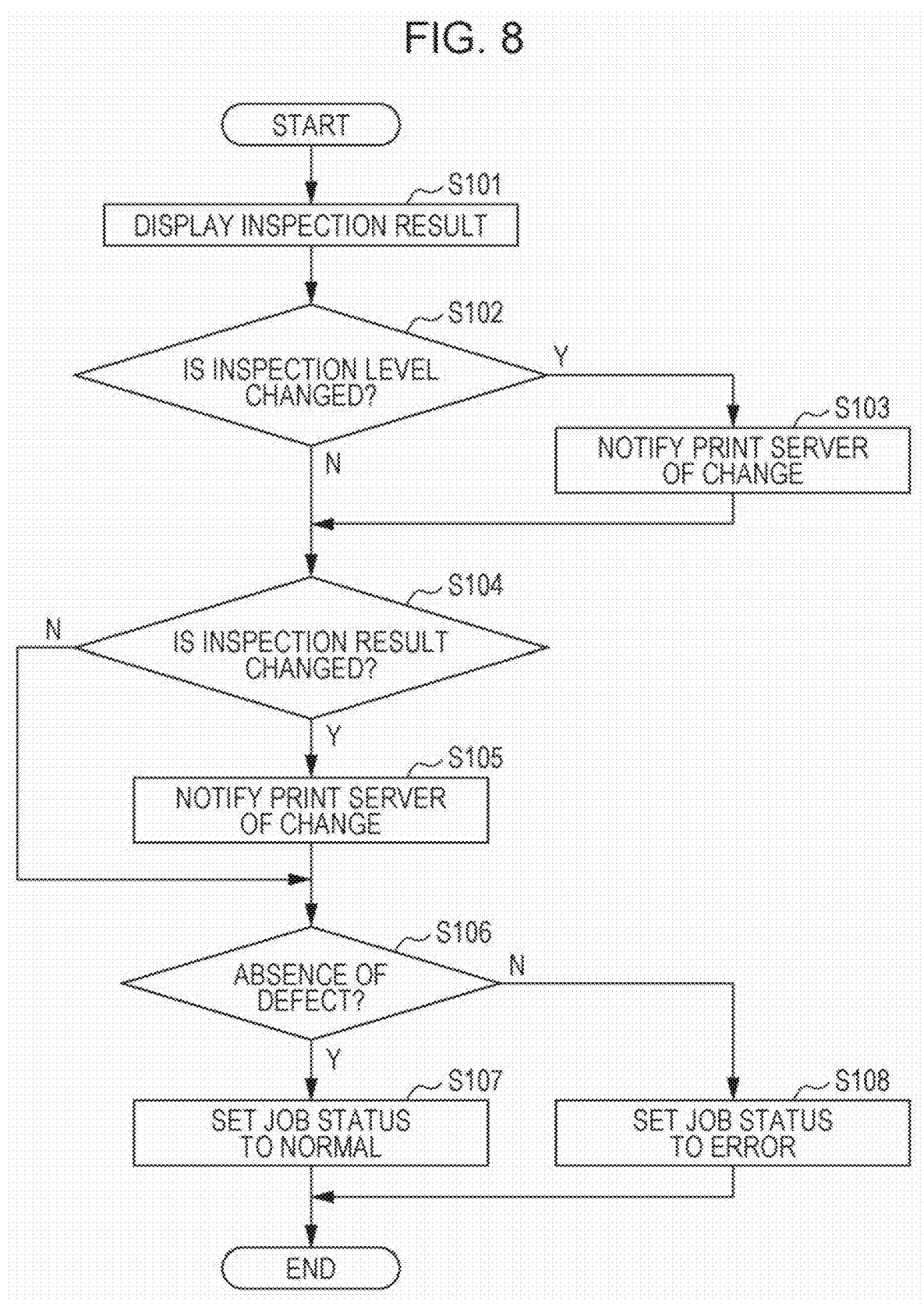
FIG. 8 is a flowchart of a process according to an exemplary embodiment.

FIG. 8 is a flowchart of a process according to an exemplary embodiment. The process is performed when the CPU 12*b* executes a program.

First, the CPU 12*b* performs an inspection at a preset initial level, that is, the default level, or an inspection level set by a user, and displays a result of the inspection on the display 12*f* (S101). Concurrently with this processing, the CPU 12*b* automatically performs an inspection at an inspection level that is different from the preset initial level or the inspection level set by the user, and stores a result of the inspection into the storage device 12*g* or the RAM 12*d*.

Then, the CPU 12*b* determines whether or not the user has performed an operation for changing the inspection level (S102). In the case where the user has performed the changing operation (YES in S102), the CPU 12*b* notifies the print server 10 of the change of the inspection level (S103).

In the case where the user has not performed an operation for changing the inspection level (NO in S102) or after the CPU 12*b* notifies the print server 10 of the change in accordance with the operation by the user for changing the inspection level, the CPU 12*b* determines whether or not the inspection result is to be changed (S104).

In the case where the user has performed an operation for changing the inspection result, the CPU 12*b* displays a changed inspection result in accordance with the changing operation by the user, and the determination result in S104 is "YES". The CPU 12*b* notifies the print server 10 that the inspection result has been changed (S105).

Next, the CPU 12*b* determines whether or not the inspection result at the changed inspection level indicates absence of a defect (S106). Then, the CPU 12*b* supplies a control signal corresponding to presence or absence of a defect to the print server 10 to control a printing operation at the printer 14. That is, in the case where there is no defect (YES in S106), the CPU 12*b* supplies a control signal indicating that a printed material is normal to the print server 10. The print server 10 treats the inspection target job as being normal and continues the printing operation (S107). In contrast, in the case where there is a defect in the inspection result at the changed inspection level (NO in 3106), the CPU 12*b* supplies a control signal indicating that there is a defect in the printed material to the print server 10. The print server 10 treats the target inspection job as an error (S108).

In the case where a job is treated as an error when there is a defect in the job, the job is basically suspended. However, the user may be able to set a condition for the suspension, an operation after the suspension, and the like. For example, the proportion of the number of defective pages to the number of total pages may be set as a condition for suspension, error processing may be performed or an operation by the user may be waited for as an operation after the suspension, or insertion of a recovery sheet or offsetting with a resumption sheet may be performed as offsetting at the time when a defect occurs. The CPU 12*b* supplies a control signal corresponding to the presence of a defect to the print server 10 in accordance with the condition mentioned above. The print server 10 performs error processing in accordance with the condition set by the user.

Furthermore, inspection results described below may be obtained from inspections at a plurality of inspection levels:

(a) Case where a defect is detected at an inspection level set in advance for a job, (b) Case where no defect is detected at an inspection level set in advance for a job but a defect is detected at a different inspection level, and (c) Case where no defect is detected at any inspection level.

In the cases (a) and (b) out of the cases (a) to (c) described above, an inspection result at a different inspection level is displayed on the display 12*f* in accordance with an operation by the user. However, no detection result would need to be displayed for the case (c). Even in the case (c), the CPU 12*b* may display a notification indicating that there is no display of an inspection result on the display 12*f* so that the user is notified.

When an inspection result at a different inspection level is displayed in accordance with an operation by the user, there may be cases (d) to (f):

(d) the inspection result is not changed, (e) the inspection result is changed from "presence of a defect" to "absence of a defect", and (f) the inspection result is changed from "absence of a defect" to "presence of a defect".

In the cases (e) and (f), the inspection level set in advance for the job is highly required to be changed. Thus, it is desirable that the CPU 12*b* notify the print server 10 of the changed inspection level.

Next, specific examples of screens displayed on the display 12*f* in an exemplary embodiment will be described.

Figures 9, 10:
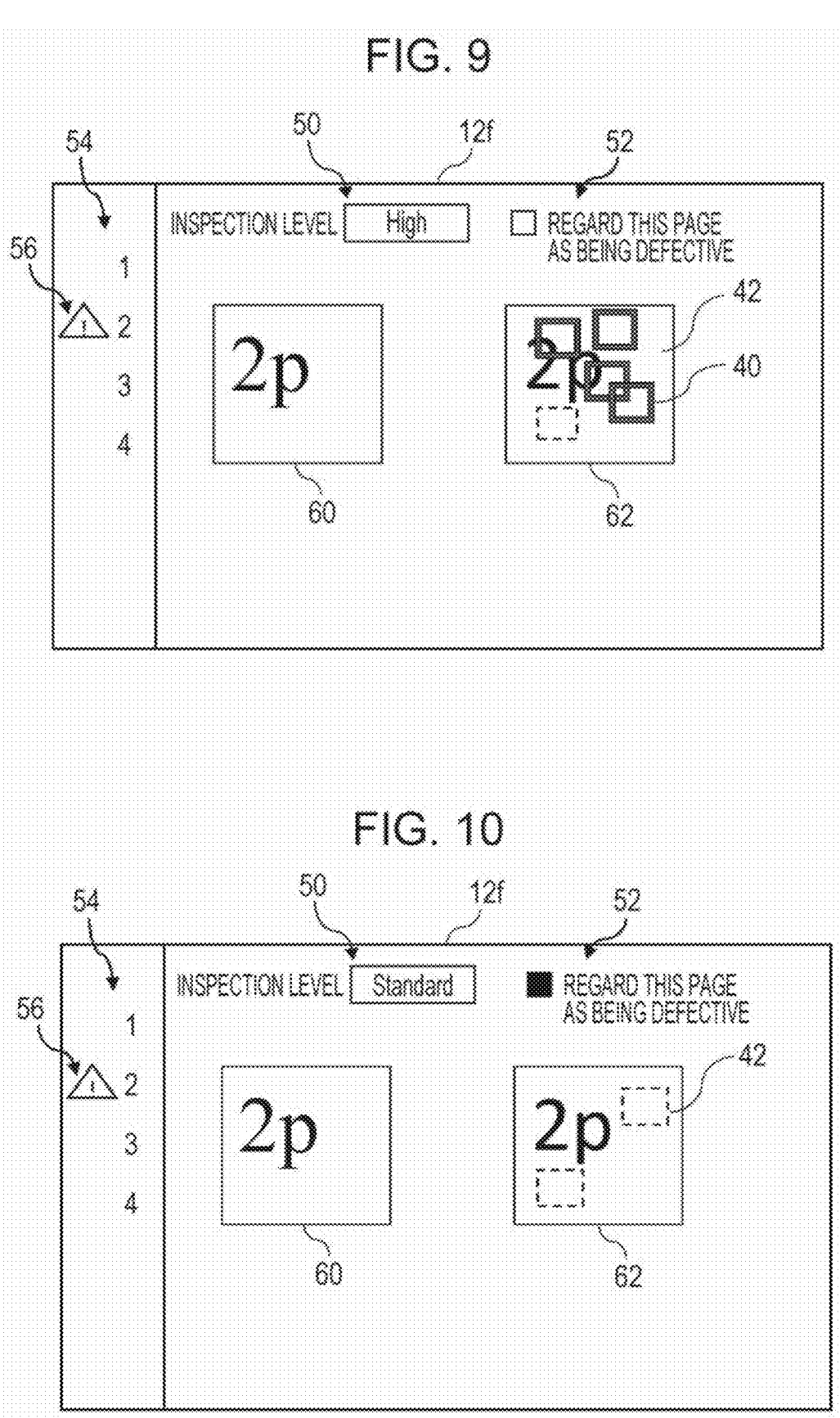
FIG. 9 illustrates a first example of a screen for an inspection result in an exemplary embodiment.
FIG. 10 illustrates a second example of a screen for an inspection result in an exemplary embodiment.

FIG. 9 is a display screen for an inspection result in the case where inspection level is set to High. On the display screen for the inspection result displayed on the display 12*f*, an inspection level input field 50 for setting an inspection level and a checkbox 52 for setting whether or not an inspection target page is regarded as being defective are displayed. In the inspection level input field 50, a pull-down menu including "High", "Standard", "Low", and "Optimal" is displayed, so that the user is able to select any one of the inspection levels. In FIG. 9, an example of the screen for the case where the user has selected "High" is displayed. At the center of the screen, a reference image 60 serving as a reference for an inspection created based on a rasterization result of a job and a scanned image 62 obtained by scanning with the built-in scanner a printed material printed by the printer 14 are displayed in parallel. In FIG. 9, the reference image 60 for the second page out of multiple pages forming the job and the scanned image 62 corresponding to the reference image 60 are displayed. Within the scanned image 62, positions of the defects 40 and 42 detected by the inspection at the inspection level "High" are indicated as rectangular regions.

Furthermore, in a left part of the screen, an inspection result display field 54 for each of the multiple pages forming the job is displayed. A mark 56 is displayed such that presence or absence of a defect in each page is able to be identified. That is, in the case where a defect is detected in the second page, the mark 56 indicating a defect is displayed for the second page.

The CPU 12*b* performs an inspection at the inspection level "High", and at the same time, automatically performs inspections at the inspection levels "Standard", "Low", and "Optimal" and stores results of the inspections into the storage device 12*g* or the RAM 12*d*. "Optimal" represents the lowest inspection level at which a defect with the lowest "color difference" and lowest "size" set in advance by the user is able to be detected.

FIG. 10 illustrates a display screen for an inspection result for the case where the user has changed the inspection level from "High" on the screen illustrated in FIG. 9 to "Standard". At the center of the screen, the reference image 60 serving as a reference for the inspection created based on the rasterization result of the job and the scanned image 62 obtained by scanning with the built-in scanner the printed material printed by the printer 14 are displayed in parallel. Within the scanned image 62, positions of the defects 42 detected by the inspection at the inspection level "Standard" are indicated as rectangular regions. Furthermore, in a left part of the screen, the inspection result display field 54 for each of the multiple pages forming the job is displayed, and the mark 56 is displayed such that presence or absence of a defect in each page is able to be identified.

In the case where the user has determined, by visually checking the inspection result for the inspection level "High" and the inspection result for the inspection level "Standard", that the defects 40 and 42 displayed for the inspection level "High" are complicated and the inspection result at the inspection level "High" is thus not appropriate and that the defects 42 are able to be clearly visually recognized at the inspection level "Standard" and defects are thus clearly present, the user ticks the checkbox 52 "Regard this page as being defective". Thus, it is confirmed that defects are present in the second page as an inspection target. The CPU 12*b* notifies the print server 10 of the inspection level "Standard", which is used for this inspection, and information indicating that defects are present in the second page.

Because out of the defects 40 and 42 illustrated in in FIGS. 9 and 10, the defects 40 and 42 are defects that are detected at the "High" inspection level and the defects 42 are defects that are detected at the "Standard" inspection level, it is desirable that the CPU 12*b* display the defects 40 and 42 such that they are able to be distinguished from each other in FIGS. 9 and 10. For example, the defects 40 are displayed in red, and the defects 42 are displayed in yellow.

Furthermore, in FIG. 10, in the case where the checkbox 52 "Regard this page as being defective" is ticked for the inspection level "Standard", it is suitable that the mark 56 for the inspection result for the inspection level "High" is able to be identified by, for example, displaying the mark 56 in gray or changing the shape or color of the mark 56.

Figure 11:
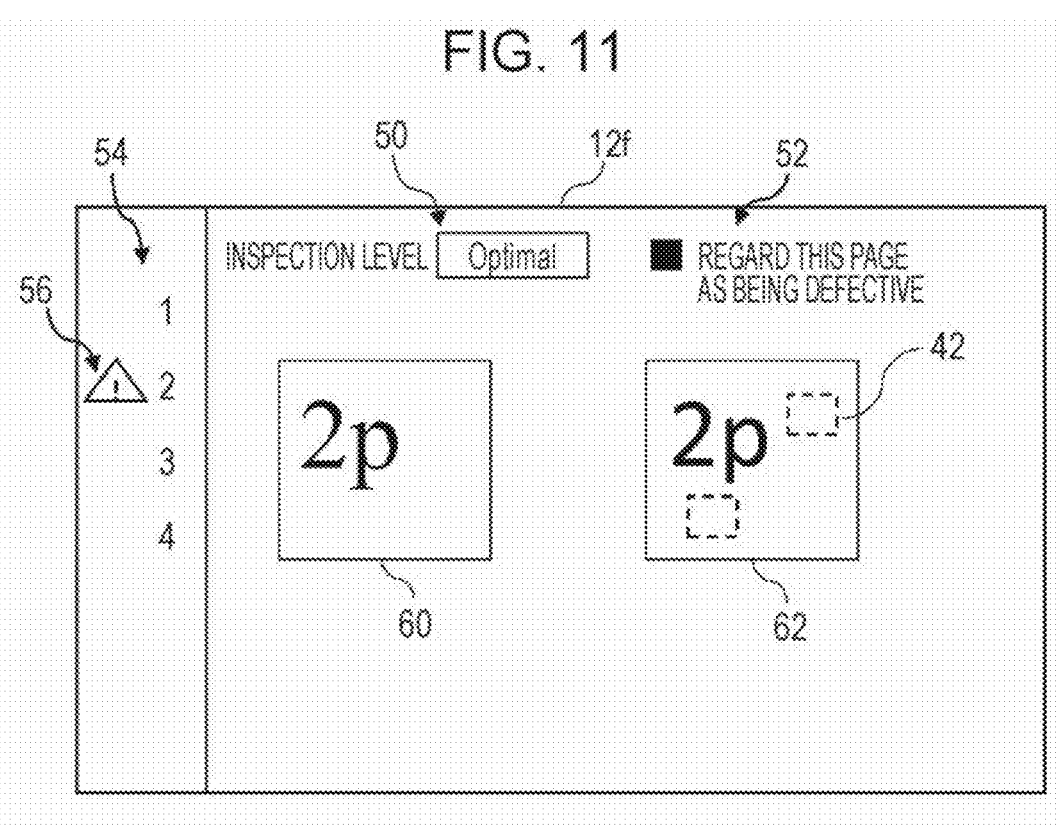
FIG. 11 illustrates a third example of a screen for an inspection result in an exemplary embodiment.

FIG. 11 illustrates a display screen for an inspection result for the case where the user has changed the inspection level from "High" on the screen illustrated in FIG. 9 to "Optimal". At the center of the screen, the reference image 60 serving as a reference for the inspection created based on the rasterization result of the job and the scanned image 62 obtained by scanning with the built-in scanner the printed material printed by the printer 14 are displayed in parallel. Within the scanned image 62, positions of the defects 42 detected by the inspection at the inspection level "Optimal" are indicated as rectangular regions. Furthermore, in a left part of the screen, the inspection result display field 54 for each of the multiple pages forming the job is displayed, and the mark 56 is displayed such that presence or absence of a defect in each page is able to be identified.

In the case where the user has determined, by visually checking the inspection result for the inspection level "High" and the inspection result for the inspection level "Optimal", that the defects 40 and 42 displayed for the inspection level "High" are complicated and the inspection result at the inspection level "High" is thus not appropriate and that the defects 42 are able to be clearly visually recognized at the inspection level "Optimal" and defects are thus clearly present, the user ticks the checkbox 52 "Regard this page as being defective". Thus, it is confirmed that defects are present in the second page as an inspection target. The CPU 12*b* notifies the print server 10 of the inspection level "Optimal", which is used for this inspection, and information indicating that defects are present in the second page.

In FIG. 11, the inspection level "Optimal" is the same as the inspection level "Standard". Thus, the inspection result screens in FIGS. 10 and 11 are the same. Obviously, however, the inspection level "Optimal" may be the same as the inspection level "Low".

In the case where the user has performed an operation for changing the inspection level from "High" to "Standard", when the user visually recognizes the inspection result for the inspection level "Standard" and closes the inspection screen, the CPU 12*b* may display a message for confirming whether or not to change the default inspection level for the job on the display 12*f*.

For example, in the case where the user has performed an operation for closing the inspection result screen, a confirmation message "Do you wish to change the inspection level set for Job XX from High to Standard?" and selection buttons "YES" and "NO" are displayed on the display 12*f* in accordance with the operation by the user. When the user operates the "YES" button, the CPU 12*b* notifies the print server 10 of information indicating that the default inspection level for the job will be changed to "Standard".

As described above, according to this exemplary embodiment, the printed material inspection apparatus 12 performs an inspection at a preset inspection level, and at the same time, automatically performs an inspection at an inspection level that is different from the preset inspection level and stores the result of the inspection. Then, the printed material inspection apparatus 12 displays the inspection result in accordance with an operation by a user. Thus, a printed material that is determined to be defective by the inspection at the preset inspection level may be regarded as being non-defective and does not require re-printing.

Furthermore, a result of a stricter inspection of a printed material that has once been inspected at a looser inspection level is able to be obtained easily. If there is an issue in the result of the stricter inspection, it may be determined, if necessary, that there is a defect.

Thus, according to this exemplary embodiment, the range of inspection level used for the printed material inspection apparatus 12 may be widened, and adjustment (tuning) of the inspection level is simplified. Furthermore, by changing the inspection level or inspection result of a job and notifying the change to the print server 10, re-printing of the job may be reduced.

The exemplary embodiments of the present disclosure have been described above. However, the present disclosure is not limited to the exemplary embodiments described above, and various modifications may be made.

<First Modification>

In an exemplary embodiment described above, a user selects and sets an inspection level from among "High", "Standard", and "Low", (and "Optimal") that are incorporated in advance in the system. However, the user may be able to adjust and set an inspection level in a desired manner.

Figure 12:
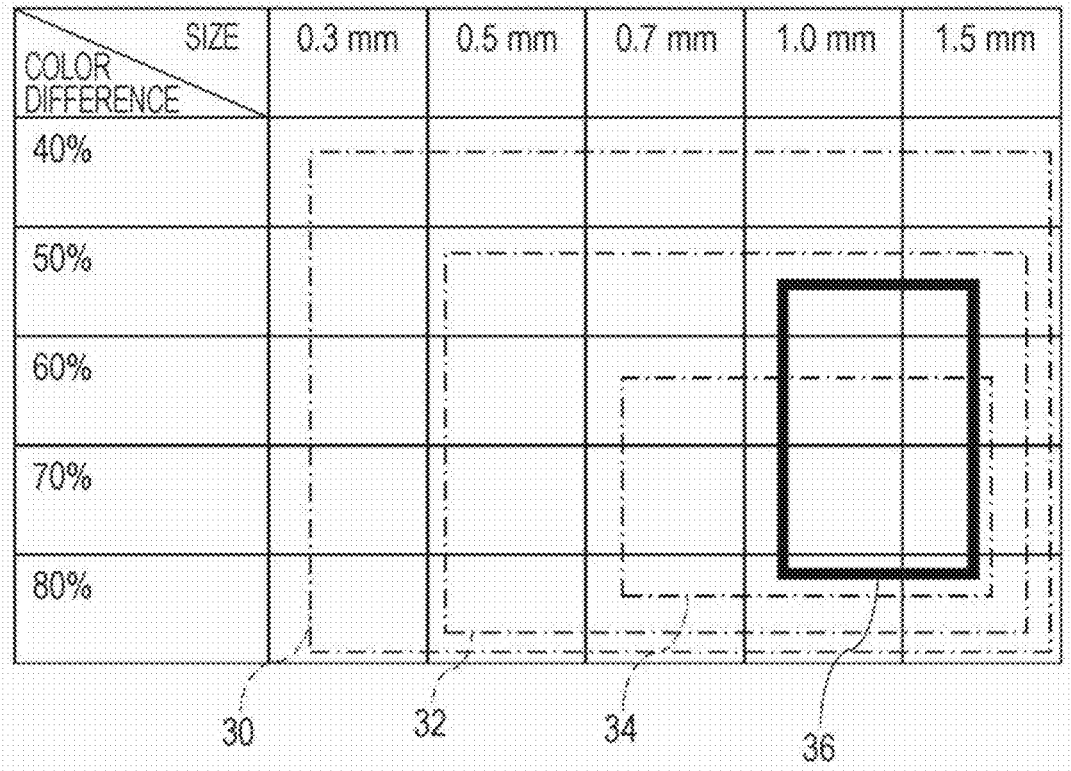
FIG. 12 is a schematic diagram of inspection levels for combinations of color difference and size in a modification.

FIG. 12 illustrates another example of a plurality of inspection levels used by the CPU 12*b* for performing inspections of whether or not a defect is present in a printed material. FIG. 12 corresponds to FIG. 4. Although the three levels, the High inspection level 30, the Standard inspection level 32, and the Low inspection level 34, are set in advance as inspection levels, the user is further able to set an inspection level in a desired manner, in addition to the three inspection levels. In FIG. 12, as a range of the combination of color and size, a Customized inspection level 36 is added. The Customized inspection level 36 is stricter in terms of color difference and looser in terms of size than the Low inspection level 34. The user is able to set the Customized inspection level 36 in a desired range for the combination of color difference and size.

Instead of the combination of color difference and size, other indices may be used for setting the Customized inspection level 36. For example, by taking into consideration the degree of defect and setting the number of defects that are detected at the "High" inspection level to 100%, an inspection level at which a certain percentage of the number of defects that are detected at the "High" inspection level is detected may be set as the Customized inspection level 36. The user is able to set a desired Customized inspection level 36 by specifying what percentage of the total defects the user wants to detect.

Figure 13:
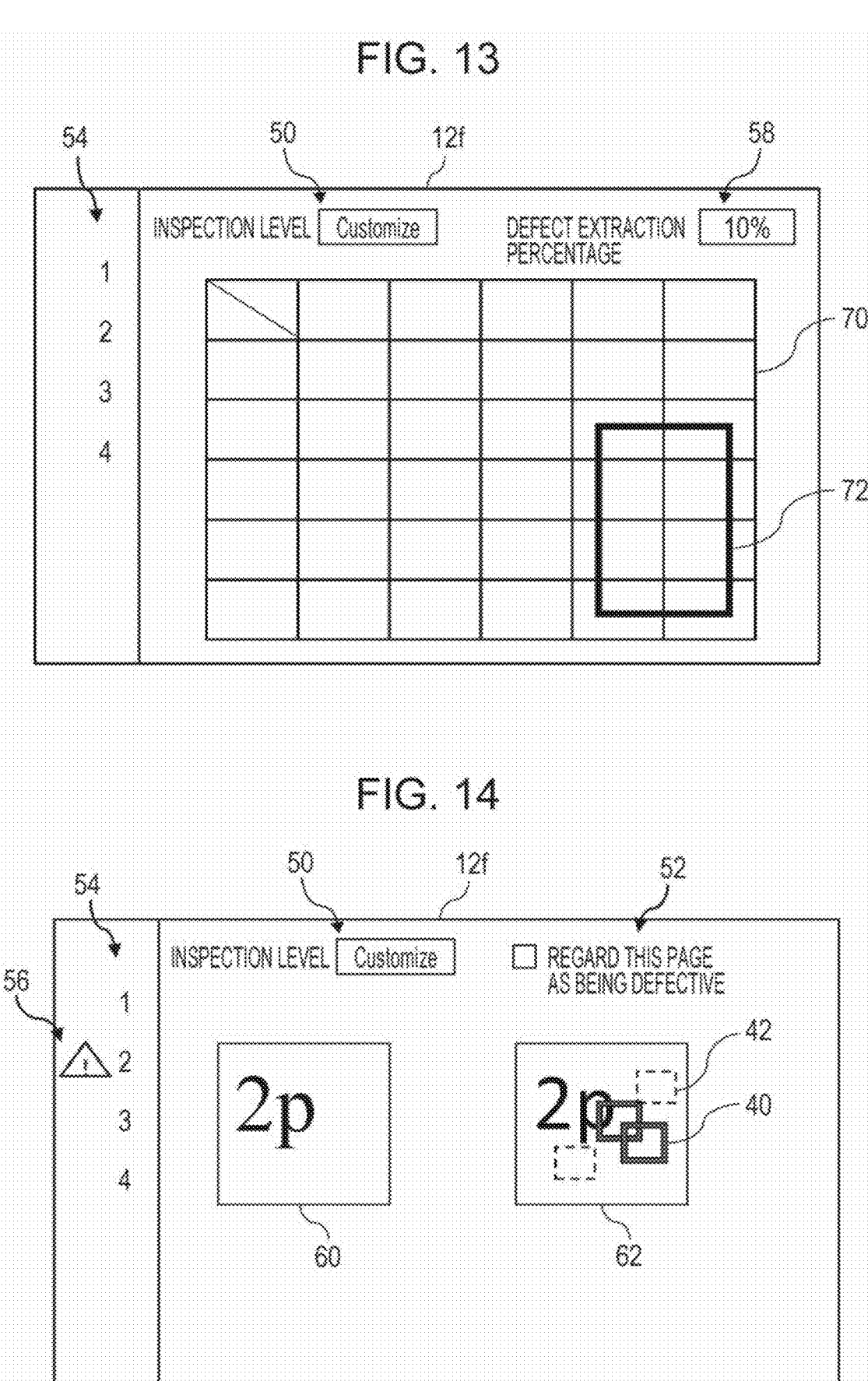
FIG. 13 illustrates a first example of a screen for an inspection result in a modification.

FIG. 13 illustrates an example of a screen for the case where the user sets a customized inspection level. When "Customize" is set for the input field 50 for the inspection level, an input field 58 for a defect extraction percentage is displayed, and a defect extraction percentage for the entire job is input. For example, the user sets the defect extraction percentage to "10%".

At the center of the screen, a table 70 of the combination of color difference and size and a rectangular region 72 indicating an inspection level corresponding to the defect extraction percentage of "10%" are displayed. An inspection level at which the degree of defect is 10% when the number of defects that are detected at the "High" inspection level is set to 100%, is calculated by an arithmetic operation.

FIG. 14 illustrates an example of a screen for an inspection result for the case where an inspection is performed at the Customized inspection level illustrated in FIG. 13. At the center of the screen, the reference image 60 serving as a reference for the inspection created based on the rasterization result of the job and the scanned image 62 obtained by scanning with the built-in scanner the printed material printed by the printer 14 are displayed in parallel. Within the scanned image 62, positions of the defects 40 and 42 detected by the inspection at the inspection level "Customize" are indicated as rectangular regions. Furthermore, in a left part of the screen, the inspection result display field 54 for each of the multiple pages forming the job is displayed, and the mark 56 is displayed such that presence or absence of a defect in each page is able to be identified.

When the user visually recognizes the inspection result screen, ticks the checkbox 52, and performs an operation for closing the screen, the CPU 12*b* displays a confirmation message "Do you wish to change the inspection level set for Job XX to Customize?" and selection buttons "YES" and "NO" on the display 12*f* in accordance with the operation by the user. When the user operates the "YES" button, the CPU 12*b* notifies the print server 10 of information indicating that the default inspection level for the job will be changed to "Customize".

<Second Modification>

In an exemplary embodiment described above, in the case where the default inspection level or the inspection level set by the user is "Low", an inspection at the inspection level "Standard" or "High" is automatically performed concurrently with or subsequently to the inspection at the default inspection level or the inspection level set by the user and a result of the inspection that has been automatically performed is stored in the storage device 12*g* or the RAM 12*d*. In the case where the user ticks the checkbox 52 for the default inspection level or the inspection level set by the user, a defect is detected also in "Standard" or "High". Thus, the CPU 12*b* does not necessarily display the inspection result at the inspection level "Standard" or "High" on the display 12*f*.

<Third Modification>

In an exemplary embodiment, in the case where the CPU 12*b* performs inspections at four inspection levels, "High", "Standard", "Low", and "optimal, the degree of defect at each of the four inspection levels when the number of defects that are detected at the "High" inspection level is set to 100%, may be calculated and displayed on the display 12*f*.

For example, the degree of defect is set as described below:

"High" inspection level: 100%,

"Standard" inspection level: 20%,

"Low" inspection level: 5%, and

"Optimal" inspection level: 10%.

Figure 15:
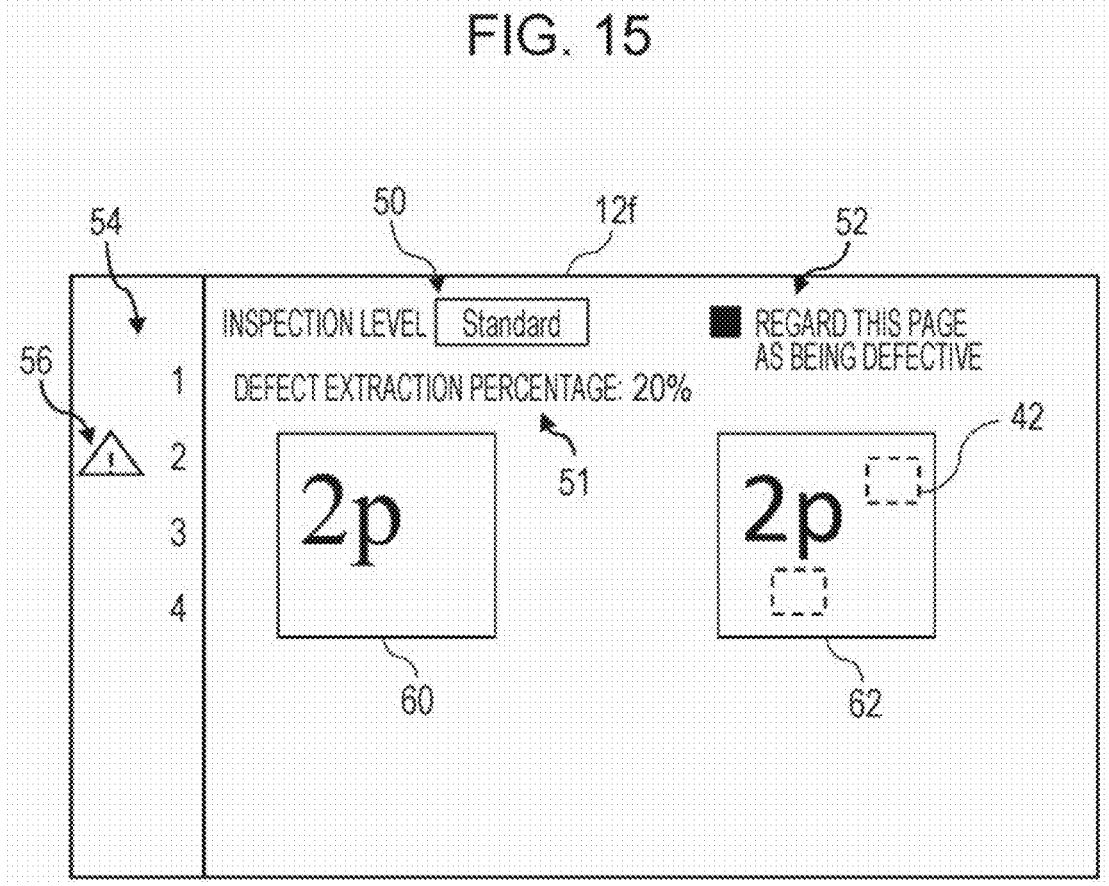
FIG. 15 illustrates a third example of a screen for an inspection result in a modification.

FIG. 15 illustrates an example of a screen for the case described above. The degree of defect detected by an inspection at an inspection level is displayed as a defect extraction percentage 51 in a region below the input field 50 for the inspection level. The user is able to set an inspection level suitable for the job by referencing the degree of defect at each of the inspection levels.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A printed material inspection system comprising:

a processor configured to inspect a quality of a printed material; and a display that displays a result of the inspection, wherein the processor is configured to: by reading and executing a program, compare a scanned image obtained by scanning an inspection target page of the printed material, out of pages forming a job, with a reference image created based on rasterize data of the inspection target page and perform an inspection of whether or not a first defect is present in the scanned image at a first inspection level, which is a preset initial level or a level set by a user;

automatically perform an inspection of whether or not a second defect is present in the scanned image at a second inspection level that is different from the first inspection level; and display the first defect and the second defect on the display so that the first defect is displayed in a manner corresponding to the first inspection level and the second defect is displayed in a manner corresponding to the second inspection level.

2. The printed material inspection system according to claim 1, wherein the processor is configured to switch display between an inspection result for the first inspection level and an inspection result for the second inspection level.

3. The printed material inspection system according to claim 1, wherein the first inspection level and the second inspection level include at least a relatively high inspection level and a relatively low inspection level.

4. The printed material inspection system according to claim 2, wherein the first inspection level and the second inspection level include at least a relatively high inspection level and a relatively low inspection level.

5. The printed material inspection system according to claim 3, wherein the processor is configured to, in a case where the first inspection level is the relatively high inspection level, automatically perform an inspection of whether or not the second defect is present at the second inspection level as the relatively low inspection level.

6. The printed material inspection system according to claim 4, wherein the processor is configured to, in a case where the first inspection level is the relatively high inspection level, automatically perform an inspection of whether or not the second defect is present at the second inspection level as the relatively low inspection level.

7. The printed material inspection system according to claim 3, wherein the processor is configured to, in a case where the first inspection level is the relatively low inspection level, automatically perform an inspection of whether or not the second defect is present at the second inspection level as the relatively high inspection level.

8. The printed material inspection system according to claim 4, wherein the processor is configured to, in a case where the first inspection level is the relatively low inspection level, automatically perform an inspection of whether or not the second defect is present at the second inspection level as the relatively high inspection level.

9. The printed material inspection system according to claim 7, wherein the processor is configured to display the first defect and does not display the second defect.

10. The printed material inspection system according to claim 8, wherein the processor is configured to display the first defect and does not display the second defect.

11. The printed material inspection system according to claim 1, wherein the processor is further configured to:

automatically perform an inspection of whether or not a third defect is present in the scanned image at a third inspection level that is different from the first inspection level and the second inspection level; and switch display between the first defect, the second defect, and the third defect on the display in accordance with selection by the user.

12. The printed material inspection system according to claim 1, wherein the processor is further configured to display an inspection level at which all defects to be detected are able to be detected, out of a plurality of inspection levels, on the display.

13. The printed material inspection system according to claim 2, wherein the processor is further configured to display an inspection level at which all defects to be detected are able to be detected, out of a plurality of inspection levels, on the display.

14. The printed material inspection system according to claim 3, wherein the processor is further configured to display an inspection level at which all defects to be detected are able to be detected, out of a plurality of inspection levels, on the display.

15. The printed material inspection system according to claim 4, wherein the processor is further configured to display an inspection level at which all defects to be detected are able to be detected, out of a plurality of inspection levels, on the display.

16. The printed material inspection system according to claim 1, wherein the processor is further configured to calculate a degree of defect for each of inspections at a plurality of inspection levels and display the degree of defect on the display.

17. The printed material inspection system according to claim 16, wherein the processor is configured to receive a desired degree of defect, wherein the processor is further configured to generate a new inspection level corresponding to the received desired degree of defect, perform an inspection at the generated new inspection level, and display a result of the inspection on the display.

18. The printed material inspection system according to claim 1, wherein the processor is further configured to output a control signal for controlling a printing operation for the printed material in accordance with an inspection result.

19. A printed material inspection method comprising:

comparing a scanned image obtained by scanning an inspection target page of a printed material, out of pages forming a job, with a reference image created based on rasterize data of the inspection target page and performing an inspection of whether or not a first defect is present in the scanned image at a first inspection level, which is a preset initial level or a level set by a user;

automatically performing an inspection of whether or not a second defect is present in the scanned image at a second inspection level that is different from the first inspection level; and displaying the first defect and the second defect on a display so that the first defect is displayed in a manner corresponding to the first inspection level and the second defect is displayed in a manner corresponding to the second inspection level.

20. A non-transitory computer readable medium storing a program causing a computer to execute a process comprising:

comparing a scanned image obtained by scanning an inspection target page of a printed material, out of pages forming a job, with a reference image created based on rasterize data of the inspection target page and performing an inspection of whether or not a first defect is present in the scanned image at a first inspection level, which is a preset initial level or a level set by a user;

automatically performing an inspection of whether or not a second defect is present in the scanned image at a second inspection level that is different from the first inspection level; and displaying the first defect and the second defect on a display so that the first defect is displayed in a manner corresponding to the first inspection level and the second defect is displayed in a manner corresponding to the second inspection level.

21. The printed material inspection system according to claim 1, wherein at the first inspection level a first image difference is determined as the first defect, and at the second inspection level a second image difference that is larger than the first image difference is determined as the second defect.

\* \* \* \* \*